(12) United States Patent
Oohashi et al.

(10) Patent No.: US 6,441,526 B1
(45) Date of Patent: Aug. 27, 2002

(54) ALTERNATOR

(75) Inventors: Atsushi Oohashi; Yoshihito Asao, both of Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/576,199

(22) Filed: May 23, 2000

(30) Foreign Application Priority Data

Jan. 27, 2000 (JP) ........................................ 2000-018611

(51) Int. Cl.[7] .............................. H02K 3/32; H02K 1/22; H02K 3/04
(52) U.S. Cl. ......................... 310/184; 310/201; 310/208
(58) Field of Search ................................ 310/52–60 A, 310/201–208, 254; 29/596–598

(56) References Cited

U.S. PATENT DOCUMENTS

| | | | | |
|---|---|---|---|---|
| 1,826,295 A | * | 10/1931 | Apple | 310/201 |
| 2,407,935 A | * | 9/1946 | Perfetti et al. | 310/201 |
| 5,955,810 A | * | 9/1999 | Umeda et al. | 310/208 |
| 5,965,965 A | * | 10/1999 | Umeda et al. | 310/52 |
| 6,011,332 A | * | 1/2000 | Umeda et al. | 310/58 |
| 6,177,747 B1 | * | 1/2001 | Maeda et al. | 310/179 |
| 6,181,045 B1 | * | 1/2001 | Umeda et al. | 310/201 |
| 6,222,295 B1 | * | 4/2001 | Umeda et al. | 310/179 |

FOREIGN PATENT DOCUMENTS

| | | | |
|---|---|---|---|
| JP | 11-164504 | 6/1999 | ............ H02K/3/24 |
| JP | 11098788 | 9/1999 | |

* cited by examiner

*Primary Examiner*—Tran Nguyen
(74) *Attorney, Agent, or Firm*—Sughrue Mion, PLLC

(57) ABSTRACT

Pairs of conductor segments inserted from an end surface of a stator core into pairs of slots three slots apart are arranged so that connecting portions of the pairs of conductor segments are substantially parallel to each other when the stator is viewed along an axial direction.

9 Claims, 9 Drawing Sheets

ALTERNATOR

BACKGROUND OF THE INVENTION

1. Field of the Invention

The present invention relates to an alternator driven by an internal combustion engine, for example, and in particular relates to a construction of a stator therein.

2. Description of the Related Art

FIG. 9 is a cross-section of a conventional automotive alternator, FIG. 10 is a partial enlargement of the automotive alternator in FIG. 10, FIG. 11 is a partial perspective of a stator in FIG. 9 viewed from a rear bracket 2 end, and FIG. 12 is a partial perspective of the stator in FIG. 9 viewed from a front bracket 1 end.

This alternator includes: a case 3 composed of an aluminum front bracket 1 and an aluminum rear bracket 2; a shaft 6 disposed within the case 3 having a pulley 4 secured to a first end thereof; a Lundell-type rotor 7 secured to the shaft 6; fans 5a and 5b secured to both end surfaces of the rotor 6; a stator 8 secured to an inner wall of the case 3; slip rings 9 secured to a second end of the shaft 6 for supplying electric current to the rotor 7; a pair of brushes 10 sliding on the slip rings 9; brush holders 11 accommodating the brushes 10; a rectifier 12 in electrical contact with the stator 8 for converting alternating current generated in the stator 8 into direct current; a heat sink 17 fitted over the brush holder 11; and a regulator 18 fastened to the heat sink 17 by adhesive for adjusting the magnitude of the alternating voltage generated in the stator 8.

The rotor 7 is composed of a rotor coil 13 for generating magnetic flux on passage of electric current, and a pair of first and second pole cores 20 and 21 disposed so as to cover the rotor coil 13, magnetic poles being produced in the pair of pole cores 20 and 21 by the magnetic flux. The pair of pole cores 20 and 21 are made of iron and each has eight claw-shaped magnetic poles 22 and 23 secured to the shaft so as to be spaced at even pitch circumferentially around a circumferential edge, facing each other so as to intermesh.

The stator 8 includes a stator core 15 composed of a cylindrical laminated iron core in which a number of slots extending longitudinally are formed at a predetermined pitch in a circumferential direction, and a three-phase stator winding 16 wound into the stator core 15.

Air intake vents 1a and 2a are formed in central portions of the front bracket 1 and the rear bracket 2, respectively, and air discharge vents 1b and 2b are formed in outer circumferential shoulder portions of the front bracket 1 and the rear bracket 2, respectively.

Next, the wiring construction of the a-phase stator winding portion 16a of the three-phase stator winding 16 will be-explained with reference to the winding diagram in FIG. 13. Moreover, this diagram shows the wiring construction when the stator 8 is viewed from the rear bracket 2 end, and in the figure solid lines indicate wire at the rear bracket 2 end (explained below as connecting portions), and dotted lines indicate wire at the front bracket 1 end (explained below as joining portions).

The a-phase stator winding portion 16a includes first and second winding portions 31 and 32. The first winding portion 31, which is connected to an a-phase lead wire 100, has its starting point at the third position from an inner circumferential side (hereinafter the positions counted in order from the inner circumferential side will be called the first, second, third, and fourth positions, respectively) inside a slot 15a whose slot number is number 1, extends counterclockwise at the front bracket 1 end and enters a slot 15a at the fourth position of slot number 4. Then, the first winding portion 31 extends clockwise at the rear bracket 2 end, enters a slot 15a at the first position of slot number 1, and passes through to the front bracket 1 end. Next, the first winding portion 31 extends counterclockwise at the front bracket 1 end, enters a slot 15a at the second position of slot number 4, and passes through to the rear bracket 2 end. Then, the first winding portion 31 extends counterclockwise and enters a slot 15a at the third position of slot number 7, and passes through to the front bracket 1 end.

In this manner, wires leading out at the rear bracket 2 end from the fourth position in each of the slots 15a each turn towards the front bracket 1 end and enter the first position in a slot 15a three slots away in a clockwise direction. Wires leading out at the rear bracket 2 end from the second position in each of the slots 15a each turn towards the front bracket 1 end and enter the third position in a slot 15a three slots away in a counterclockwise direction.

Then, finally, a wire projecting towards the rear bracket 2 end from the second position of slot number 34 extends in a counterclockwise direction and arrives at the fourth position of slot number 1, and this becomes the end point of the first winding portion 31.

The end point of the first winding portion 31 is also the starting point of the second winding portion 32, and the second winding portion 32 extends clockwise at the front bracket 1 end and enters a slot 15a at the third position of slot number 34. Then, the wire leading out at the rear bracket 2 end extends clockwise at the rear bracket 2 end, enters a slot 15a at the second position of slot number 31, and passes through to the front bracket 1 end. Next, the wire extends clockwise at the front bracket 1 end, enters a slot 15a at the first position of slot number 28, and passes through to the rear bracket 2 end. Then, the wire extends counterclockwise and enters a slot 15a at the fourth position of slot number 31, and passes through to the front bracket 1 end. This wire extends clockwise and enters a slot 15a at the third position of slot number 28.

In this manner, wires leading out at the rear bracket 2 end from the first position in each of the slots 15a each turn towards the front bracket 1 end and enter the fourth position in a slot 15a three slots away in a counterclockwise direction. Wires leading out at the rear bracket 2 end from the third position in each of the slots 15a each turn towards the front bracket 1 end and enter the second position in a slot 15a three slots away In a clockwise direction.

Then, finally, a wire projecting towards the front bracket 1 end from the second position of slot number 1 extends in a clockwise direction and arrives at the first position of slot number 34, and this becomes the end point of the second winding portion 32. A neutral point lead wire 101 is connected to this end point.

In this manner, in the a-phase stator winding portion 16a, the first winding portion 31, which is connected to the a-phase lead wire 100, makes one lap in a generally counterclockwise direction in every third slot while changing direction to a clockwise direction at a number of places, and then the second winding portion 32 makes one lap in a generally clockwise direction in every third slot while changing direction to a counterclockwise direction at a number of places, constituting a four-turn a-phase stator winding portion 16a.

Similarly, a b-phase stator winding portion and a c-phase stator winding portion are formed by offsetting by one slot 15a and, together with the a-phase stator winding portion, constitute the star-connected three-phase stator winding 16.

The three-phase stator winding 16 of the above construction is formed by joining a number of short conductor segments 50 such as the one shown in FIG. 11.

The conductor segments 50, which are component elements of the wires, are each formed into a U shape from copper wire material having a circular cross section coated with insulation, and each includes a pair of first and second straight portions 51a and 51b housed inside the slots 15a, a connecting portion 52 connecting the straight portions 51a and 51b to each other, and joining portions 53a and 53b disposed on end portions of the straight portions 51 a and 51 b for joining adjacent conductor segments 50 to each other.

Next, the steps in forming the a-phase stator winding portion 16a using the conductor segments 50 will be explained.

First, as shown in FIG. 11, the first straight portion 51a of each conductor segment 50 and the second straight portion 51b three slots away are each inserted from the rear bracket 2 end into a predetermined slot number and position, such that four straight portions 51a and 51b of conductor segments 50 are arranged to line up in a row in a radial direction within each of the slots 15a.

Then, at the front bracket 1 end, the joining portions 53a extending from the straight portions 51a at the front bracket 1 end and the joining portions 53b extending from the straight portions 51b three slots away are bent and joined to each other as indicated by the dotted lines in the wiring diagram in FIG. 13, forming the four-turn a-phase stator winding portion 16a.

The four-turn b-phase stator winding portion and the four-turn c-phase stator winding portion are formed similarly and, together with the a-phase stator winding portion, constitute the star-connected three-phase stator winding 16.

In an automotive alternator constructed in this manner, current is supplied from a battery (not shown) by means of the brushes 10 and the slip rings 9 to the rotor coil 13, and magnetic flux is generated. The claw-shaped magnetic poles 22 of the first pole core 20 are polarized with north-seeking (N) poles by the magnetic flux, and the claw-shaped magnetic poles 23 of the second pole core 21 are polarized with south-seeking (S) poles. At the same time, the rotational torque of the engine is transmitted to the shaft 6 by means of a belt and the pulley 4, and the rotor 7 is rotated. Thus, a rotating magnetic field is imparted to the three-phase stator winding 16 and electromotive force is generated in the three-phase stator winding 16. This alternating electromotive force is converted into direct current by means of the rectifier 12, its magnitude is regulated by the regulator 18, and the battery is recharged.

At the rear bracket 2 end, external air is drawn in by rotation of the rear-end fan 5b through the air intake vents 2a disposed opposite the heat sink of the rectifier 12 and the heat sink 17 of the regulator 18, respectively, cooling the rectifier 12 and the regulator 18, then cooling the coil ends 70b of the three-phase stator winding 16 at the rear bracket 2 end, before being expelled through the air discharge vents 2b to the outside.

At the same time, at the front bracket 1 end, external air is drawn in axially by rotation of the front-end fan 5a through the air intake vents 1 a, cooling the coil ends 70a of the three-phase stator winding 16 at the front bracket 1 end, before being expelled through the air discharge vents 1b to the outside.

In the automotive alternator of the above construction, because, as can be seen from FIG. 13, the connecting portions 52 of the conductor segments 50 cross each other at the rear bracket 2 end, inner connecting portions 52B straddling from the second position within a slot 15a to the third position three slots away must be arranged so as to fit inside outer connecting portions 52A straddling from the first position within the slot 15a to the fourth position three slots away, as shown in FIG. 11, and for that reason, the following problems occur:

a. Because the radius of curvature of the inner connecting portions; 52B is reduced, the insulation easily peels off the inner connecting portions: 52B, and because the inner connecting portions 52B are inside the outer connecting portions 52A, cooling of the inner connecting portions 52B by the cooling ventilation from the fan 5b is difficult;

b. Because radial dimensions L1 of the outer connecting portions 52A are enlarged, there is a risk of the outer connecting portions 52A contacting the rotor 7 or the fan 5b;

c. Two types of conductor segment 50 must be prepared; and d. Because axial dimensions of the coil ends 70b are enlarged, noise caused by interference between the cooling ventilation from the fan 5b and the coil ends 70b arises easily.

SUMMARY OF THE INVENTION

The present invention aims to solve the above problems and an object of the present invention is to provide an alternator enabling reduced contact between the coil ends and the rotor or the fan by diminishing radial and axial dimensions of the coil ends, also improving the cooling performance of the polyphase stator winding, and additionally enabling suppression of noise caused by interference between the cooling ventilation and the coil ends.

To this end, according to the present invention, there is provided, pairs of the conductor segments inserted from an end surface of the stator core into pair of slots separated by a predetermined number of slots are arranged such that connecting portions of the pairs of conductor segments are substantially parallel to each other when the stator is viewed along the axial direction.

DETAILED DESCRIPTION OF THE PREFERRED EMBODIMENTS

Embodiment 1

Figure 1:
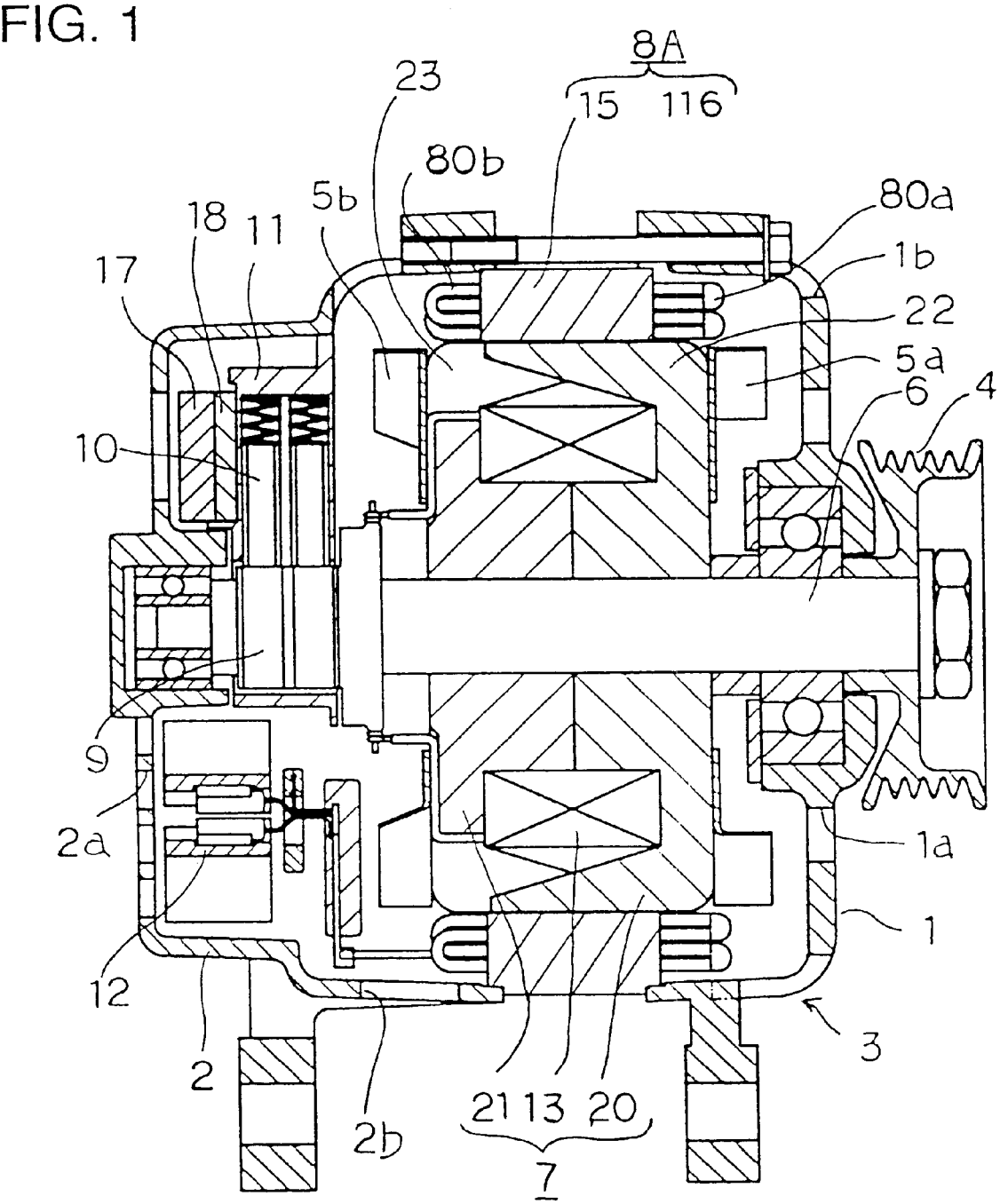
FIG. 1 is a cross section of an automotive alternator according to Embodiment 1 of the present invention.
Figure 2:
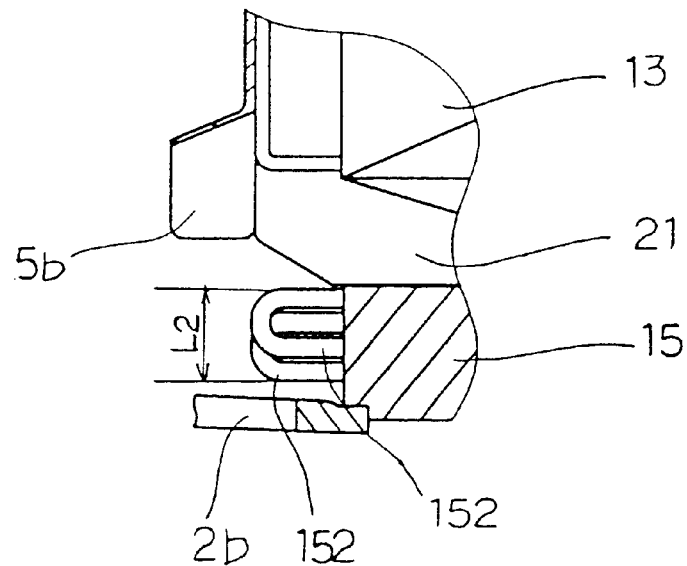
FIG. 2 is a partial enlargement of a stator in FIG. 1.
Figure 3:
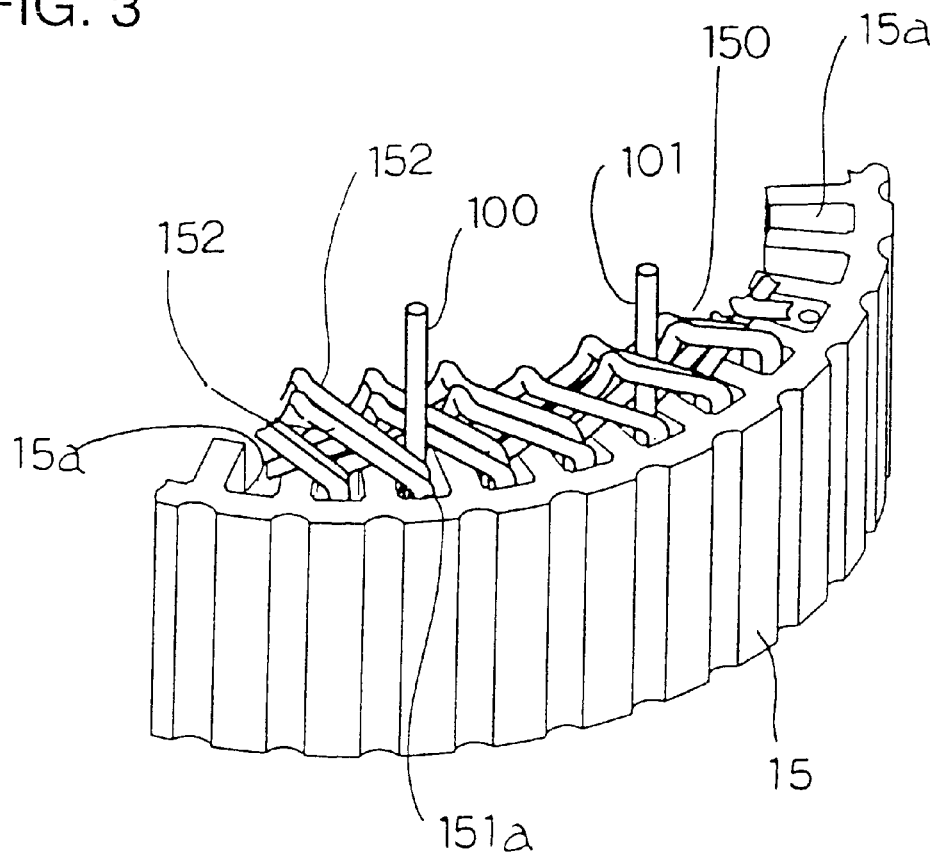
FIG. 3 is a partial perspective of the stator in FIG. 1 viewed from a rear bracket end.

FIG. 1 is a cross section of an automotive alternator according to Embodiment 1 of the present invention, FIG. 2 is a partial enlargement of the automotive alternator in FIG. 1, and FIG. 3 is a partial perspective of a stator 8A in FIG. 1 viewed from a rear bracket 2 end.

This alternator includes: a case 3 composed of an aluminum front bracket 1 and an aluminum rear bracket 2; a shaft 6 disposed within the case 3 having a pulley 4 secured to a first end thereof; a Lundell-type rotor 7 secured to the shaft 6; fans 5a and 5b secured to both end surfaces of the rotor 6; a stator 8A secured to an inner wall of the case 3; slip rings 9 secured to a second end of the shaft 6 for supplying electric current to the rotor 7; a pair of brushes 10 sliding on the slip rings 9; brush holders 11 accommodating the brushes 10; a rectifier 12 in electrical contact with the stator 8A for converting alternating current generated in the stator 8A into direct current; a heat sink 17 fitted over the brush holder 11; and a regulator 18 fastened to the heat sink 17 by adhesive for adjusting the magnitude of the alternating voltage generated in the stator 8A.

The rotor 7 is composed of a rotor coil 13 for generating magnetic flux on passage of electric current, and a pair of pole cores 20 and 21 disposed so as to cover the rotor coil 13, magnetic poles being produced in the pair of pole cores 20 and 21 by the magnetic flux. The pair of pole cores 20 and 21 are made of iron and each has eight claw-shaped magnetic poles 22 and 23 secured to the shaft so as to be spaced at even pitch circumferentially around a circumferential edge, facing each other so as to intermesh.

The stator 8A includes a stator core 15 composed of a cylindrical laminated iron core in which a number of slots extending longitudinally are formed at a predetermined pitch in a circumferential direction, and a three-phase stator winding 116 wound into the stator core 15.

Air intake vents 1a and 2a are formed in central portions of the front bracket 1 and the rear bracket 2, respectively, and air discharge vents 1b and 2b are formed in outer circumferential shoulder portions of the front bracket 1 and the rear bracket 2, respectively.

Figure 13:
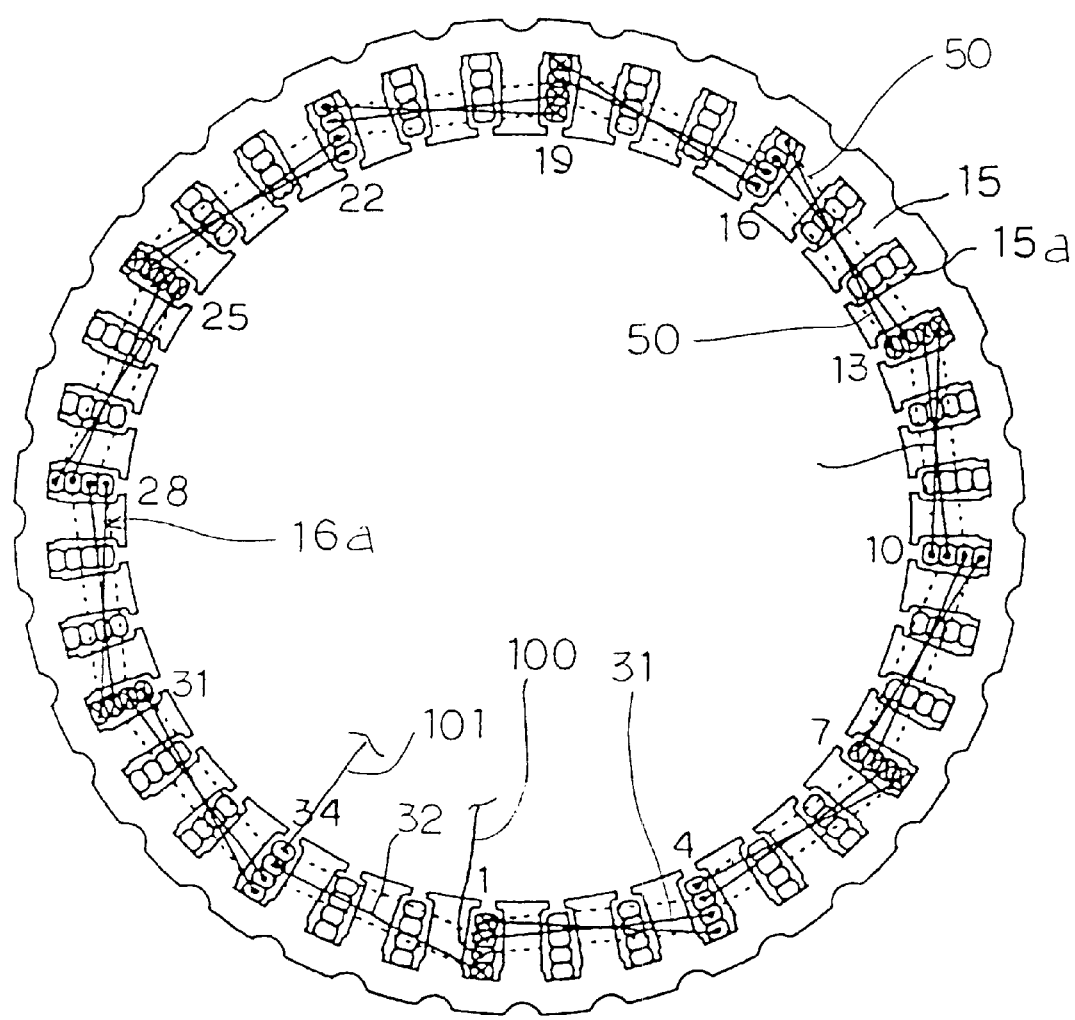
FIG. 13 is a wiring diagram for the stator in FIG. 9.

Next, the wiring construction of an a-phase stator winding portion 116a of the three-phase stator winding 116 will be explained with reference to the winding diagram in FIG. 4. Moreover, as in FIG. 13, this diagram shows the wiring construction when the stator 8A is viewed from the rear bracket 2 end, and the meanings of the solid lines and dotted lines for the wires in the figure are the same as in FIG. 13.

The a-phase stator winding portion 116a includes first and second winding portions 131 and 132. The first winding portion 131, which is connected to an a-phase lead wire 100, has its starting point at the third position from an inner circumferential side (hereinafter the positions counted in order from the inner circumferential side will be called the first, second, third, and fourth positions, respectively) inside a slot 15a whose slot number is number 1, extends counterclockwise at the front bracket 1 end and enters a slot 15a at the fourth position of slot number 4. Then, the first winding portion 131 extends clockwise at the rear bracket 2 end, enters a slot 15a at the second position of slot number 1, and passes through to the front bracket 1 end. Next, the first winding portion 131 extends counterclockwise at the front bracket 1 end, enters a slot 15a at the first position of slot number 4, and passes through to the rear bracket 2 end. Then, the first winding portion 131 extends counterclockwise and enters a slot 15a at the third position of slot number 7, and passes through to the front bracket 1 end.

In this manner, wires leading out at the rear bracket 2 end from the fourth position in the slots 15a turn towards the front bracket 1 end and enter the second position in a slot 15a three slots away in a clockwise direction. Wires leading out at the rear bracket 2 end from the first position in the slots 15a turn towards the front bracket 1 end and enter the third position in a slot 15a three slots away in a counterclockwise direction.

Then, finally, a wire projecting towards the rear bracket 2 end from the first position of slot number 34 extends in a counterclockwise direction and arrives at the fourth position of slot number 1, and this position becomes the end point of the first winding portion 131.

The end point of the first winding portion 131 is also the starting point of the second winding portion 132, and the second winding portion 132 extends clockwise at the front bracket 1 end and enters a slot 15a at the third position of slot number 34. Then, the wire leading out at the rear bracket 2 end extends clockwise at the rear bracket 2 end, enters a slot 15a at the first position of slot number 31, and passes through to the front bracket 1 end. Next, the wire extends clockwise at the front bracket 1 end, enters a slot 15a at the second position of slot number 28, and passes through to the rear bracket 2 end. Then, the wire extends counterclockwise and enters a slot 15a at the fourth position of slot number 31, and passes through to the front bracket 1 end. This wire extends clockwise and enters a slot 15a at the third position of slot number 28.

In this manner, wires leading out at the rear bracket 2 end from the first position in the slots 15a turn towards the front bracket 1 end and enter the third position in a slot 15a three slots away in a counterclockwise direction. Wires leading out at the rear bracket 2 end from the second position in the slots 15a turn towards the front bracket 1 end and enter the fourth position in a slot 15a three slots away in a counterclockwise direction.

Then, finally, a wire projecting towards the front bracket 1 end from the first position of slot number 1 extends in a clockwise direction and arrives at the second position of slot number 34, and this becomes the end point of the second winding portion 132. A neutral point lead wire 101 is connected to this end point.

In this manner, in the a-phase stator winding portion 116a, the first winding portion 131, which is connected to the a-phase lead wire 100, makes one lap in a generally counterclockwise direction in every third slot while changing direction to a clockwise direction at a number of places, and then the second winding portion 132 makes one lap in a generally clockwise direction in every third slot while changing direction to a counterclockwise direction at a number of places, constituting a four-turn a-phase stator winding portion 116a.

Similarly, a b-phase stator winding portion and a c-phase stator winding portion are formed by offsetting by one slot 15a and, together with the a-phase stator winding portion, constitute the star-connected three-phase stator winding 116.

Next, the steps in manufacturing the above-mentioned a-phase stator winding portion 116a by joining a number of short conductor segments 150 will be explained.

As shown in FIG. 3, first straight portions 151a of conductor segments 150 and second straight portions 151b three slots away are each inserted from the rear bracket 2 end into predetermined slot numbers and positions, such that four straight portions 151a and 151b of conductor segments 150 are arranged to line up in a row in a radial direction within each of the slots 15a.

Figure 4:
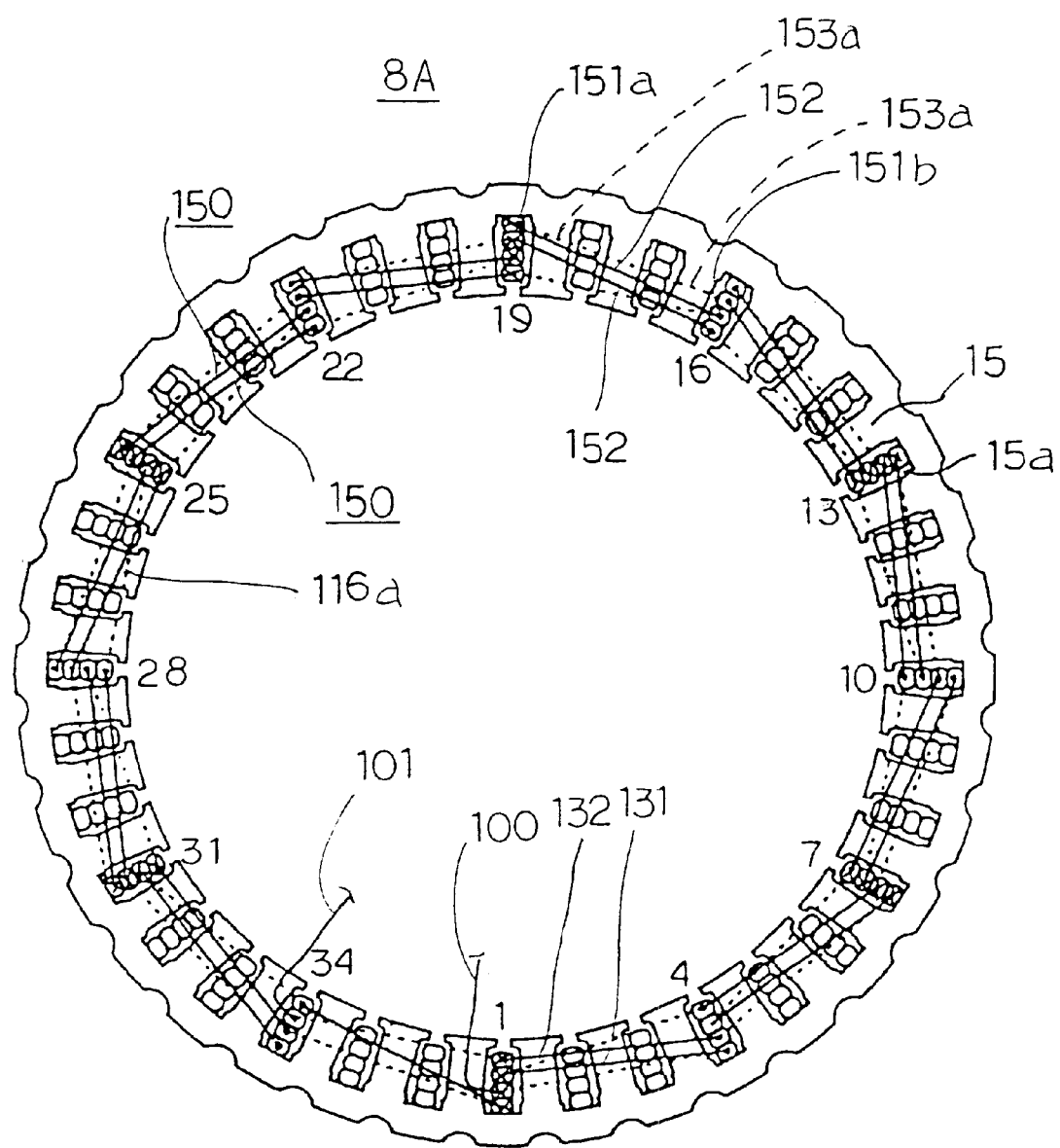
FIG. 4 is a wiring diagram for the stator in FIG. 1.

Then, at the front bracket 1 end, the joining portions 153a and 153b extending from the straight portions 151a and 151b at the front bracket 1 end are bent and joined to the joining portions 153a and 153b extending from the straight portions 151a and 151b three slots away according to the dotted lines in the wiring diagram in FIG. 4, forming the four-turn a-phase stator winding portion 116a.

The four-turn b-phase stator winding portion and the four-turn c-phase stator winding portion are formed similarly and, together with the a-phase stator winding portion 116a, constitute the star-connected three-phase stator winding 116.

In the automotive alternator of the above construction, a pair of conductor segments 150 inserted from the end of the stator core 15 which is nearest to the rear bracket 2 into pairs of slots 15a which are three slots apart are arranged such that their respective connecting portions 152 are substantially parallel when the stator 8A is viewed axially from the rear bracket 2 end, and more specifically, the first straight portion 151a of a first conductor segment 150 is positioned in the first position within a first slot 15a and the second straight portion 151b thereof is positioned in the third position of a second slot 15a three slots away, and the first straight portion 151a of a second conductor segment 150 is positioned in the second position within the first slot 15a and the second straight portion 151b thereof is positioned in the fourth position of the second slot 15a.

By adopting such a construction, both conductor segments 150 in a pair can be made identical in shape, reducing the likelihood that insulation will peel off the connecting portions 152 by eliminating the need to make the radius of curvature of the connecting portion 152 of one of the pair of conductor segments 150 extremely small. For that reason, the need to purposely coat the connecting portions 152 with epoxy resin to secure the insulation is eliminated, and more of the ventilation deflected centrifugally by the rear-end fan 5b directly contacts coil ends 80b of the three-phase stator winding 116 compared to when epoxy resin is applied, enabling temperature increases in the stator winding 116 to be suppressed. Furthermore, when a conventional degree of cooling of the three-phase stator winding 116 is sufficient, the amount of ventilation deflected by the rear-end fan 5b can be reduced in proportion to the improvement in the cooling characteristics of the coil ends 80b, enabling noise due to interference between the coil ends 80b and the cooling ventilation to be reduced.

Furthermore, as can be seen from FIG. 2, radial dimensions L2 of the coil ends 80b are reduced, decreasing the frequency of contact with the rotor 7 and the rear-end fan 5b on the radial inside, and contact with the rear bracket 2 on the radial outside. Furthermore, axial dimensions of the coil ends 80b are also reduced, increasing the amount of ventilation drawn in through the air intake vents 2a, flowing past the rectifier 12, the regulator 18, and the coil ends 80b, and through the air discharge vents 2b to the outside, enabling temperature increases in the rectifier 12, the regulator 18, and the coil ends 80b to be suppressed.

Embodiment 2

Figure 5:
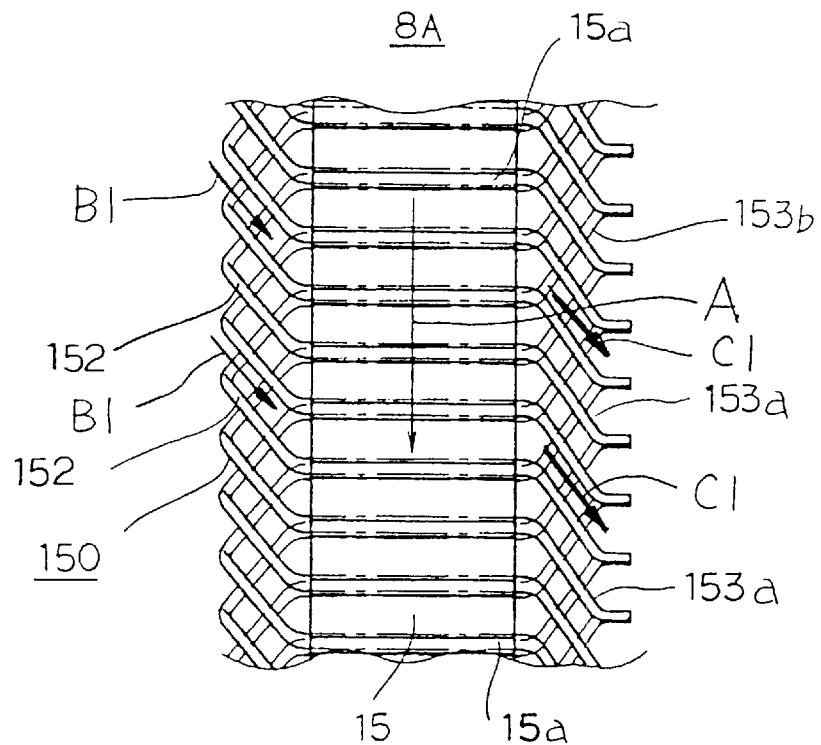
FIG. 5 is a diagram explaining the state of cooling ventilation in an automotive alternator according to Embodiment 2 of the present invention.

FIG. 5 is a diagram of a radially inner portion of the stator 8A of an automotive alternator according to Embodiment 2 of the present invention viewed radially from the shaft 6 side. in this embodiment, the radially innermost connecting portions 152 of the conductor segments 150 are inclined such that cooling ventilation is guided towards the stator core 15. Furthermore, the radially innermost joining portions 153a and 153b of the conductor segments 150 are inclined such that cooling ventilation is directed away from the stator core 15.

In this embodiment, the rear-side fan 5b, which is integrated with the rotor 7, is rotated in the direction of arrow A by the rotor which turns in that direction, and cooling ventilation flows along the radially innermost connecting portions 152 in the direction of arrows B1 at the coil ends 80b at the rear bracket 2 end inside the case 3.

Furthermore, cooling ventilation flows along the radially innermost joining portions 153a and 153b in the direction of arrows C1 at the coil ends 80a at the front bracket 1 end due to rotation of the front-end fan 5a.

This embodiment is an example applied when air pressure is greater at the rear bracket 2 end of the rotor 7 than at the front bracket 1 end due to relative capacity of the fans 5a and 5b. In this case, cooling ventilation generated by rotation of the fan 5b flows through an air gap between the rotor 7 and the stator 8A, but because the connecting portions 152 and the joining portions 153a and 153b are inclined so as to match this flow, the cooling ventilation flows smoothly through the air gap, efficiently cooling the rotor 7 and the stator 8A. Furthermore, because the flow of cooling ventilation is smoothed, the amount of cooling ventilation increases, enabling temperature increases in the stator winding 116 to be suppressed, and also enabling noise caused by interference with the coil ends 80a and 80b to be reduced.

Embodiment 3

Figure 6:
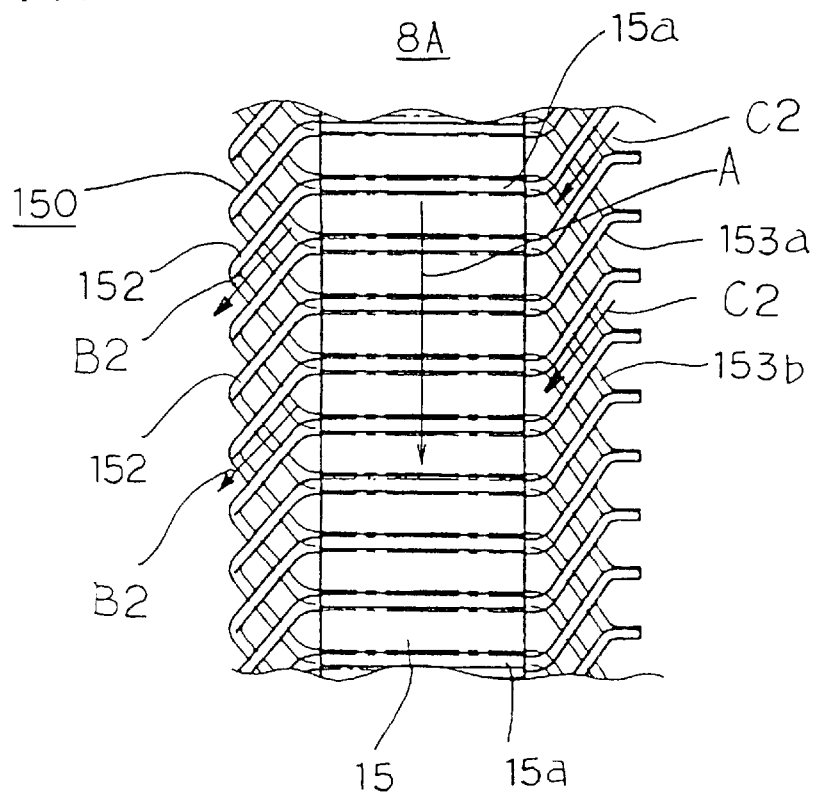
FIG. 6 is a diagram explaining the state of cooling ventilation in an automotive alternator according to Embodiment 3 of the present invention.

FIG. 6 is a diagram of a radially inner portion of the stator 8A of an automotive alternator according to Embodiment 3 of the present invention viewed radially from the shaft 6 side. In this embodiment, the radially innermost connecting portions 152 of the conductor segments 150 are inclined such that cooling ventilation is directed away from the stator core 15. Furthermore, the radially innermost joining portions 153a and 153b of the conductor segments 150 are inclined such that cooling ventilation is guided towards the stator core 15.

In this embodiment, the rear-side fan 5b, which is integrated with the rotor 7, is rotated in the direction of arrow A by the rotor which turns in that direction, and cooling ventilation flows along the radially innermost connecting portions 152 in the direction of arrows B2 at the coil ends 80b at the rear bracket 2 end inside the case 3.

Furthermore, cooling ventilation flows along the radially innermost joining portions 153a and 153b in the direction of arrows C2 at the coil ends 80a at the front bracket 1 end due to rotation of the front-end fan 5a.

This embodiment is an example applied when air pressure is greater at the front bracket 1 end of the rotor 7 than at the rear bracket 2 end due to relative capacity of the fans 5a and 5b. In this case, cooling ventilation generated by rotation of the fan 5b flows through the air gap between the rotor 7 and the stator 8A, but because the connecting portions 152 and the joining portions 153a and 153b are inclined so as to match this flow, the cooling ventilation flows smoothly through the air gap, efficiently cooling the rotor 7 and the stator 8A. Furthermore, because the flow of cooling ventilation is smoothed, the amount of cooling ventilation increases, enabling temperature increases in the stator winding 116 to be suppressed, and also enabling noise caused by interference with the coil ends 80a and 80b to be reduced.

Embodiment 4

Figure 7:
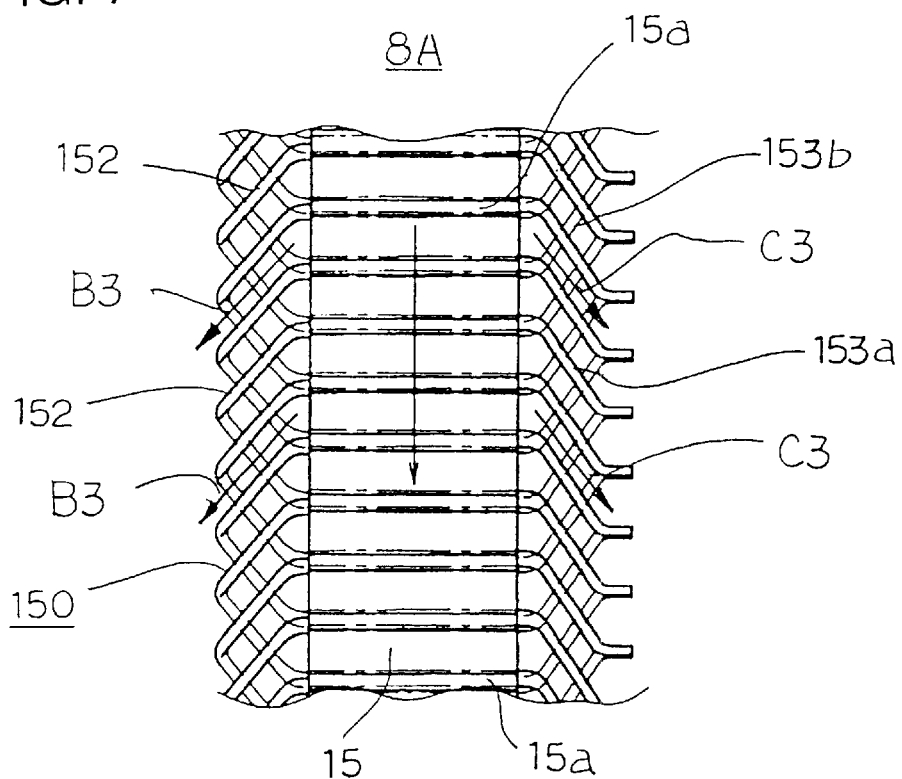
FIG. 7 is a diagram explaining the state of cooling ventilation in an automotive alternator according to Embodiment 4 of the present invention.

FIG. 7 is a diagram of a radially inner portion of the stator 8A of an automotive alternator according to Embodiment 4 of the present invention viewed from the shaft 6 side. In this embodiment, the radially innermost connecting portions 152 of the conductor segments 150 are inclined such that cooling ventilation is directed away from the stator core 15. Furthermore, the radially innermost joining portions 153*a* and 153*b* of the conductor segments 150 are inclined such that cooling ventilation is directed away from the stator core 15.

In this embodiment, the rear-side fan 5*b*, which is integrated with the rotor 7, is rotated in the direction of arrow A by the rotor which turns in that direction, and cooling ventilation flows along the radially innermost connecting portions 152 in the direction of arrows B3 at the coil ends 80*b* at the rear bracket 2 end inside the case 3.

Furthermore, cooling ventilation flows along the radially innermost joining portions 153*a* and 153*b* in the direction of arrows C3 at the coil ends 80*a* at the front bracket 1 end due to rotation of the front-end fan 5*a*.

This embodiment is an example applied when air pressure is the same at the rear bracket 2 end of the rotor 7 as at the front bracket 1 end due to relative capacity of the fans 5*a* and 5*b*. In this case, end portions of the coil ends 80*a* at the front bracket 1 end where resistance to the flow of cooling ventilation is small are exposed to cooling ventilation from the front-end fan 5*a*, and end portions of the coil ends 80*b* at the rear bracket 2 end where resistance to the flow of cooling ventilation is small are exposed to cooling ventilation from the rear-end fan 5*b*, efficiently cooling the stator winding 116. Furthermore, because the flow of cooling ventilation is smoothed, the amount of cooling ventilation increases, enabling temperature increases in the stator winding 116 to be suppressed, and also enabling noise caused by interference with the coil ends 80*a* and 80*b* to be reduced.

Embodiment 5

Figure 8:
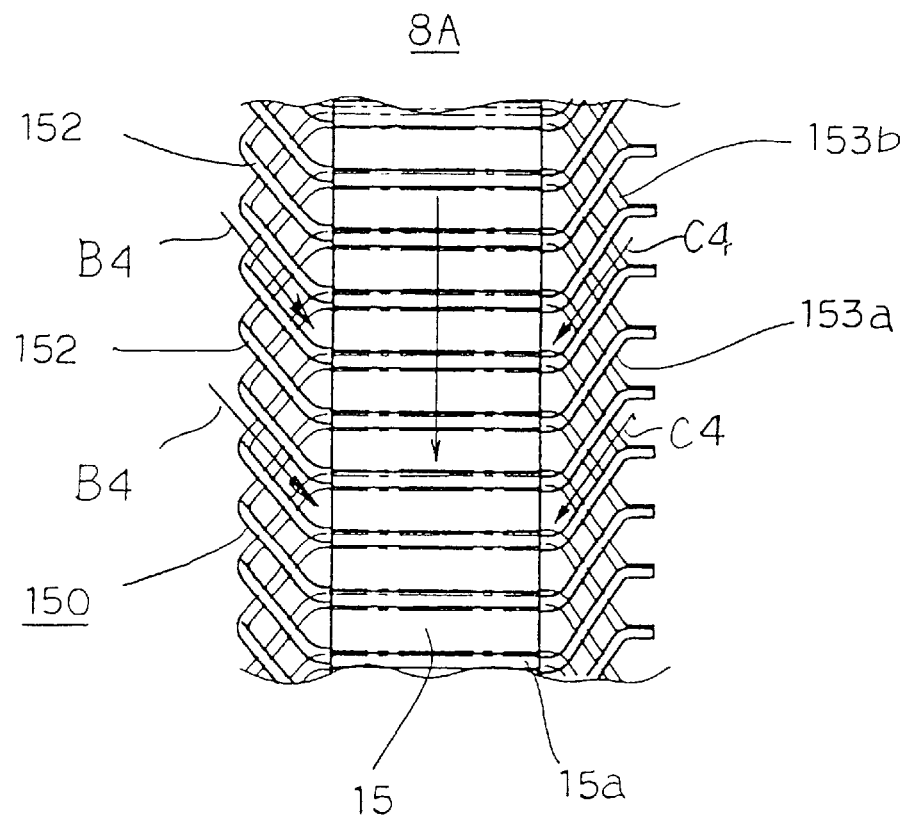
FIG. 8 is a diagram explaining the state of cooling ventilation in an automotive alternator according to Embodiment 5 of the present invention.
Figure 9:
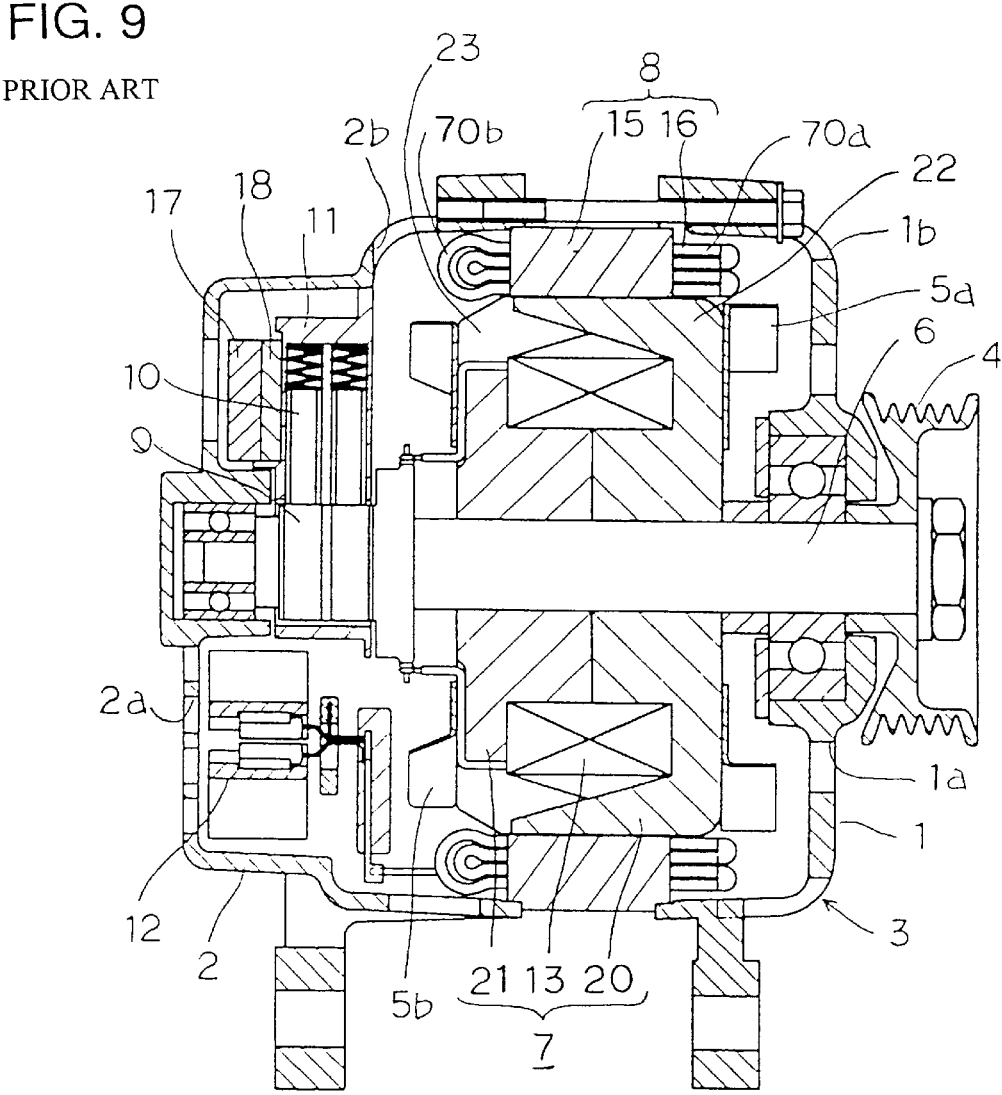
FIG. 9 is a cross section of a conventional automotive alternator.
Figure 10:
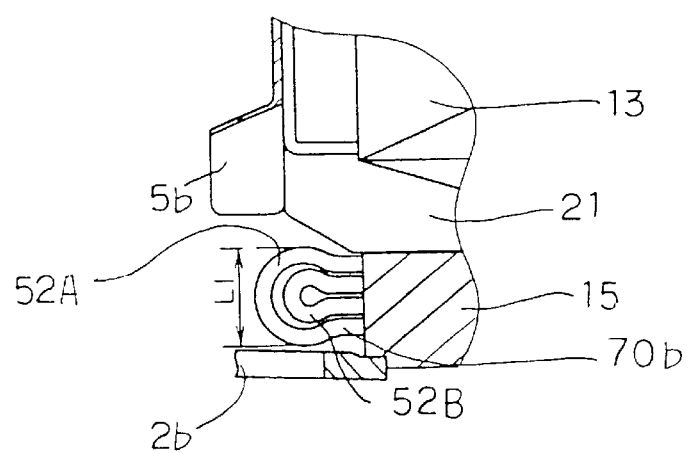
FIG. 10 is a partial enlargement of a stator in FIG. 9.
Figure 11:
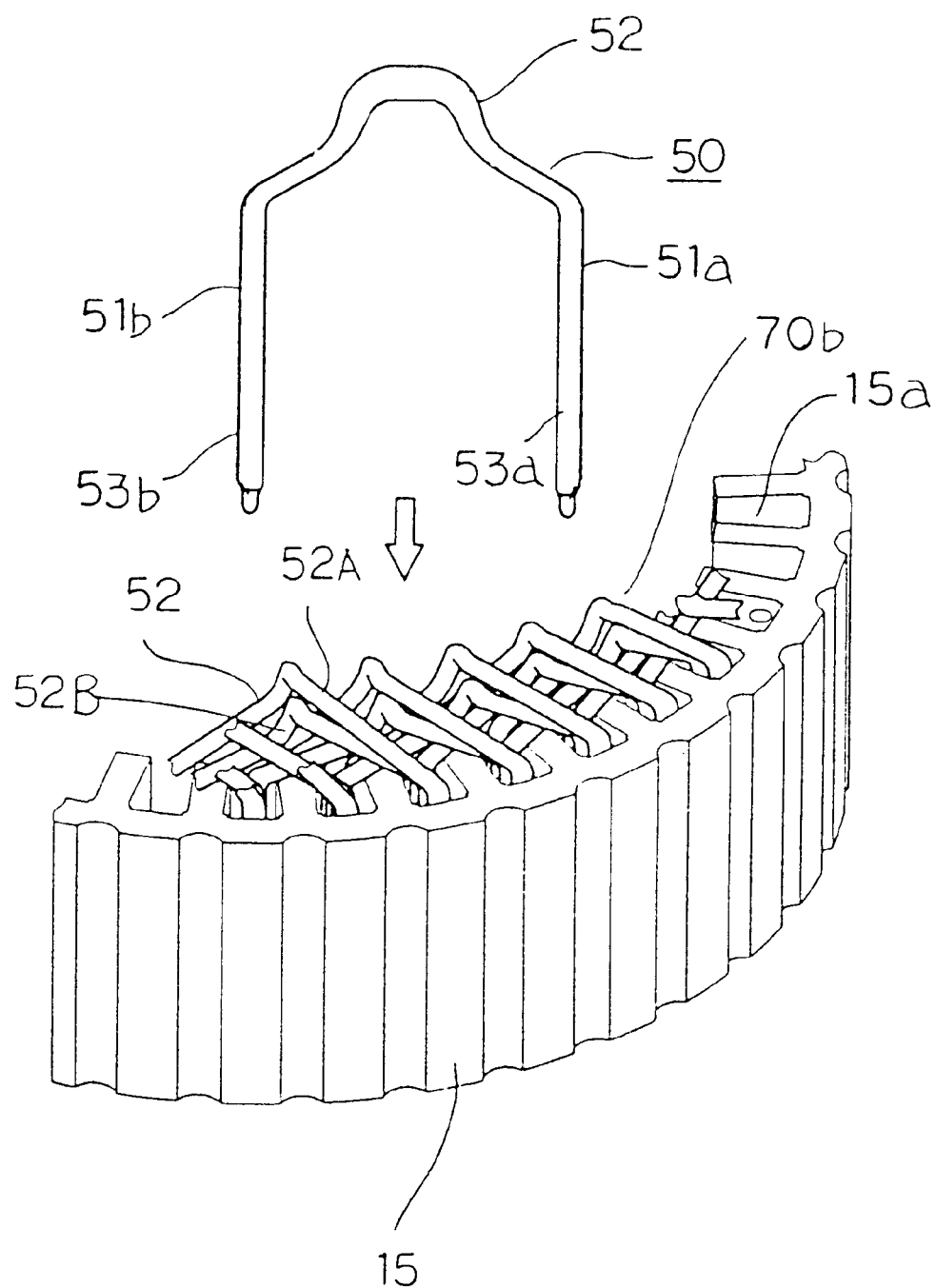
FIG. 11 is a partial perspective of the stator in FIG. 9 viewed from a rear bracket end.
Figure 12:
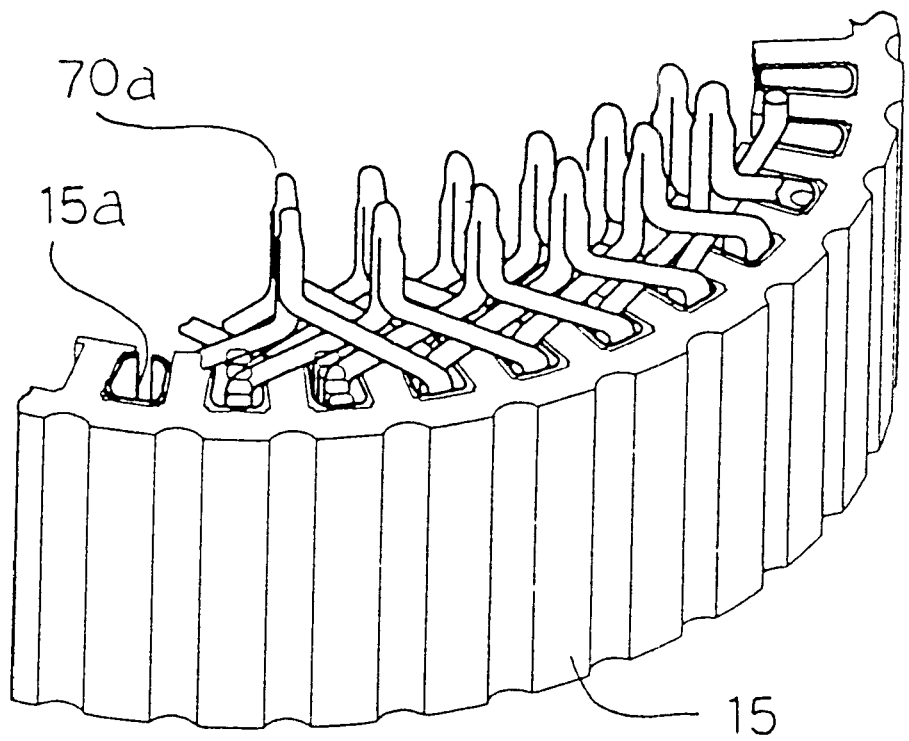
FIG. 12 is a partial perspective of the stator in FIG. 9 viewed from a front bracket end.

FIG. 8 is a diagram of a radially inner portion of the stator 8A of an automotive alternator according to Embodiment 5 of the present invention viewed from the shaft 6 side. In this embodiment, the radially innermost connecting portions 152 of the conductor segments 150 are inclined such that cooling ventilation is guided towards the stator core 15. Furthermore, the radially innermost joining portions 153*a* and 153*b* of the conductor segments 150 are inclined such that cooling ventilation is guided towards the stator core 15.

In this embodiment, the rear-side fan 5*b*, which is integrated with the rotor 7, is rotated in the direction of arrow A by the rotor which turns in that direction, and cooling ventilation flows along the radially innermost connecting portions 152 in the direction of arrows B4 at the coil ends 80*b* at the rear bracket 2 end inside the case 3.

Furthermore, cooling ventilation flows along the radially innermost joining portions 153*a* and 153*b* in the direction of arrows C4 at the coil ends 80*a* at the front bracket 1 end due to rotation of the front-end fan 5*a*.

This embodiment is an example applied when air pressure is the same at the rear bracket 2 end of the rotor 7 as at the front bracket 1 end due to relative capacity of the fans 5*a* and 5*b*. In this case, because an end surface of the stator core 15 at the front bracket 1 end is exposed to cooling ventilation from the front-end fan 5*a* and an end surface of the stator core 15 at the rear bracket 2 end is exposed to cooling ventilation from the rear-end fan 5*b*, the stator core 15 in particular is efficiently cooled. Furthermore, because the flow of cooling ventilation is smoothed, the amount of cooling ventilation increases, enabling temperature increases in the stator winding 116 to be suppressed, and also enabling noise caused by interference with the coil ends 80*a* and 80*b* to be reduced.

Moreover, each of the above embodiments has been explained with reference to conductor segments 150 having a circular cross section, but conductor segments having a rectangular cross section may also be used. When rectangular conductor segments are used the contact surface area between the straight portions of the conductor segments in the slots and the stator core is increased, increasing the amount of heat transferred to the stator core from the stator winding, further suppressing temperature increases in the stator winding, and the space factor of the stator winding is also increased.

Furthermore, the above embodiments have been explained with reference to a three-phase, 12-pole, 36-slot automotive alternator, but naturally the present invention is not limited to these numbers, and a three-phase, 12-pole, 72-slot alternator or a three-phase, 16-pole, 96-slot alternator may also be used, and a six-phase or nine-phase alternator may also be used.

As explained above, in an alternator according to one aspect of the present invention, pairs of the conductor segments inserted from an end surface of the stator core into pair of slots separated by a predetermined number of slots are arranged such that connecting portions of the pairs of conductor segments are substantially parallel to each other when the stator is viewed along the axial direction. Therefore, both conductor segments in a pair can be made identical in shape, reducing the likelihood that insulation will peel off the connecting portions by eliminating the need to make the radius of curvature of the connecting portion of one of the pair of conductor segments extremely small, thereby improving the insulation performance of the stator winding.

Furthermore, radial and axial dimensions of the coil ends can be reduced, decreasing contact with the rotor and the fan on the radial inside and contact with the bracket on the radial outside, ensuring insulation distance.

In the alternator according to one form of the present invention, straight portions of a first conductor segment of a pair of the conductor segments may be positioned in a first position and a third position, respectively, from an inner circumferential side within the slots, and straight portions of a second conductor segment of the pair of conductor segments parallel to the first conductor segment may be positioned in a second position and a fourth position, respectively, from an inner circumferential side within the slots. Therefore, the insulation performance of the four-turn stator winding is improved, and contact with the rotor and the fan on the radial inside and contact with the bracket on the radial outside are reduced, ensuring insulation distance.

In the alternator according to another form of the present invention, a fan for directly conveying ventilation to the coil ends of the polyphase stator winding may be disposed on at least one end surface of the rotor. Therefore, the coil ends are actively cooled and the amount of cooling ventilation is increased, enabling temperature increases in the stator winding to be suppressed.

In the alternator according to still another form of the present invention, air discharge vents may be formed in the case for expelling ventilation conveyed to the coil ends to an exterior portion of the case. Therefore, cooling ventilation is actively expelled from the air discharge vents and the amount of cooling ventilation is increased, enabling temperature increases in the stator winding to be suppressed.

In the alternator according to one form of the present invention, radially innermost connecting portions of the conductor segments may be inclined such that cooling ventilation generated by rotation of the fan is guided towards the stator core, and radially innermost joining portions of the conductor segments may be inclined such that cooling ventilation generated by rotation of the fan is guided away from the stator core. Therefore, the cooling ventilation flows smoothly through the air gap between the stator and the rotor, efficiently cooling the stator and the rotor. Furthermore, because the flow of cooling ventilation is smoothed, the amount of cooling ventilation increases, enabling temperature increases in the stator winding to be suppressed, and also enabling noise caused by interference between the cooling ventilation and the coil ends to be reduced.

In the alternator according to another form of the present invention, radially innermost connecting portions of the conductor segments may be inclined such that cooling ventilation generated by rotation of the fan is guided away from the stator core, and radially innermost joining portions of the conductor segments may be inclined such that cooling ventilation generated by rotation of the fan is guided towards the stator core. Therefore, the cooling ventilation flows smoothly through the air gap between the stator and the rotor, efficiently cooling the stator and the rotor. Furthermore, because the flow of cooling ventilation is smoothed, the amount of cooling ventilation increases, enabling temperature increases in the stator winding to be suppressed, and also enabling noise caused by interference between the cooling ventilation and the coil ends to be reduced.

In the alternator according to still another of the present invention, radially innermost connecting portions of the conductor segments may be inclined such that cooling ventilation generated by rotation of the fan is guided away from the stator core, and radially innermost joining portions of the conductor segments may be inclined such that cooling ventilation generated by rotation of the fan is guided away from the stator core. Therefore, end portions of both coil ends where resistance to the flow of cooling ventilation is small are exposed to a particularly large amount of cooling ventilation, efficiently cooling the coil ends. Furthermore, because the flow of cooling ventilation is smoothed, the amount of cooling ventilation increases, enabling temperature increases in the stator winding to be suppressed, and also enabling noise caused by interference between the cooling ventilation and the coil ends to be reduced.

In the alternator according to one form of the present invention, radially innermost connecting portions of the conductor segments may be inclined such that cooling ventilation generated by rotation of the fan is guided towards the stator core, and radially innermost joining portions of the conductor segments may bee inclined such that cooling ventilation generated by rotation of the fan is guided towards the stator core. Therefore, end surfaces of the stator core are exposed to cooling ventilation, efficiently cooling the stator core in particular. Furthermore, because the flow of cooling ventilation is smoothed, the amount of cooling ventilation increases, enabling temperature increases in the stator winding to be suppressed, and also enabling noise caused by interference between the cooling ventilation and the coil ends to be reduced.

In the alternator according to another form of the present invention, the conductor segments may have a rectangular cross section. Therefore the contact surface area between the straight portions of the conductor segments in the slots and the stator core is increased, increasing the amount of heat transferred to the stator core from the stator winding, further suppressing temperature increases in the stator winding, and the space factor of the stator winding is also increased.

What is claimed is:

1. An alternator comprising:
   a case;
   a rotor disposed inside said case, north-seeking and south-seeking poles being formed alternately around a rotational circumference of said rotor; and
   a stator having a stator core surrounding said rotor, and a polyphase stator winding installed in said stator core,
   a number of slots extending in an axial direction being formed in said stator core at a predetermined pitch in a circumferential direction,
   said polyphase stator winding including at least one phase of stator winding portion constructed such that wire forms coil ends which bend back outside said slots at end surfaces of said stator core, and alternates between inner layers and outer layers in a slot depth direction within said slots at intervals of a predetermined number of said slots,
   said wire being composed of a number of conductor segments each having:
      two straight portions, each being housed within a different slot amount said slots;
      a U-shaped connection portion connecting said straight portions, said connection portion protruding from a first end portion of said stator core; and
      joining portions disposed on end portions of each of said straight portions, said joining portions protruding from a second end portion of said stator core,
   said stator winding portion being constructed by connecting adjacent joining portions of said conductor segments to each other,
   pairs of said conductor segments inserted from an end surface of said stator core into pair of slots separated by a predetermined number of slots being arranged such that connecting portions of said pairs of conductor segments are substantially parallel to each other and do not overlap with each other when said stator is viewed along said axial direction.

2. The alternator according to claim 1 wherein straight portions of a first conductor segment of a pair of said conductor segments are positioned in a first position and a third position, respectively, from an inner circumferential side within said slots, and straight portions of a second conductor segment of said pair of conductor segments parallel to said first conductor segment are positioned in a second position and a fourth position, respectively, from an inner circumferential side within said slots.

3. The alternator according to claim 1 wherein a fan for directly conveying ventilation to said coil ends of said polyphase stator winding is disposed on at least one end surface of said rotor.

4. The alternator according to claim 1 wherein air discharge vents are formed in said case for expelling ventilation conveyed to said coil ends to an exterior portion of said case.

5. The alternator according to claim 3 wherein:
   radially innermost connecting portions of said conductor segments are inclined such that cooling ventilation generated by rotation of said fan is guided towards said stator core; and
   radially innermost joining portions of said conductor segments are inclined such that cooling ventilation generated by rotation of said fan is guided away from said stator core.

6. The alternator according to claim 3 wherein:
   radially innermost connecting portions of said conductor segments are inclined such that cooling ventilation generated by rotation of said fan is guided away from said stator core; and radially innermost joining portions of said conductor segments are inclined such that cooling ventilation generated by rotation of said fan is guided towards said stator core.

7. The alternator according to claim 3 wherein:

radially innermost connecting portions of said conductor segments are inclined such that cooling ventilation generated by rotation of said fan is guided away from said stator core; and radially innermost joining portions of said conductor segments are inclined such that cooling ventilation generated by rotation of said fan is guided away from said stator core.

8. The alternator according to claim 3 wherein:

radially innermost connecting portions of said conductor segments are inclined such that cooling ventilation generated by rotation of said fan is guided towards said stator core; and radially innermost joining portions of said conductor segments are inclined such that cooling ventilation generated by rotation of said fan is guided towards said stator core.

9. The alternator according to claim 1 wherein said conductor segments have a rectangular cross section.

* * * * *